United States Patent [19]
Ludwig

[11] Patent Number: 5,944,512
[45] Date of Patent: Aug. 31, 1999

[54] HEATING AND INCINERATION DEVICE

[76] Inventor: Mark Ludwig, 4560 Mount Taylor Dr., Santa Rosa, Calif. 95404

[21] Appl. No.: 09/131,500

[22] Filed: Aug. 10, 1998

[51] Int. Cl.$^6$ .............................. F23J 17/00; F23G 5/32
[52] U.S. Cl. ........................... 432/72; 110/244; 110/346; 99/473
[58] Field of Search ................................. 432/15, 19, 20, 432/72, 93, 218; 110/213, 216, 244, 345, 346, 347, 261, 263, 264, 266; 99/473

[56] References Cited

U.S. PATENT DOCUMENTS

| | | |
|---|---|---|
| 2,212,120 | 8/1940 | Kneale et al. . |
| 3,189,460 | 6/1965 | Smith, Jr. . |
| 3,848,550 | 11/1974 | Bowen ........................ 110/244 |
| 3,855,951 | 12/1974 | Giles ........................... 110/244 |
| 4,484,064 | 11/1984 | Murray . |
| 5,107,776 | 4/1992 | Garcia-Mallol . |
| 5,230,281 | 7/1993 | Wireman et al. . |
| 5,372,833 | 12/1994 | Farina . |
| 5,394,623 | 3/1995 | Sewell . |
| 5,427,746 | 6/1995 | Pereira et al. . |
| 5,709,542 | 1/1998 | Rentzel et al. . |

Primary Examiner—Teresa Walberg
Assistant Examiner—Gregory A. Wilson
Attorney, Agent, or Firm—Jack Lo

[57] ABSTRACT

A heating and incineration device includes a heating chamber for being connected to a heating application. A process stream is recirculated between the heating chamber and the heating application. An incineration tube is positioned into the heating chamber for providing the only exit for gases from the heating chamber and the heating application. A heat source is positioned within the heating chamber in spaced coaxial relation with an incineration tube inlet. The process stream is heated to a working temperature when it is passed through the heating chamber around the periphery of the heat source. The heat source is directed at the incineration tube inlet, so that the highest temperature inside the heating chamber is concentrated along an axis between the heat source and the incineration tube inlet. The distance between the incineration tube inlet and the heat source is adjustable for controlling the temperature inside the incineration tube. Pollutants in the exhaust gases flowing out through the incineration tube are incinerated by the very high temperature inside the tube. Energy efficiency is thus significantly increased by recirculating the process stream, by exhausting a small amount of gases, and by heating the process stream and incinerating pollutants with a single heat source.

20 Claims, 4 Drawing Sheets

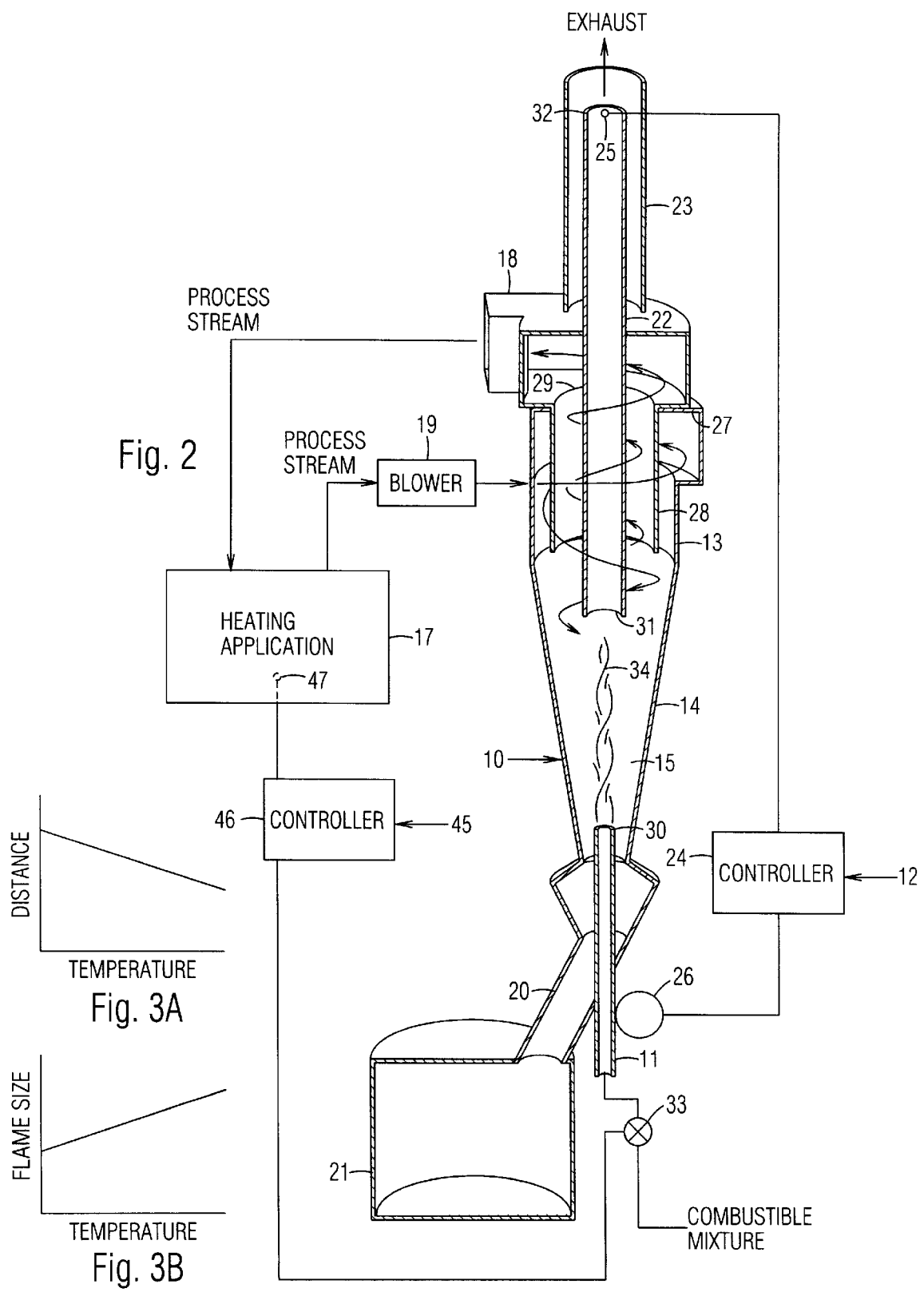

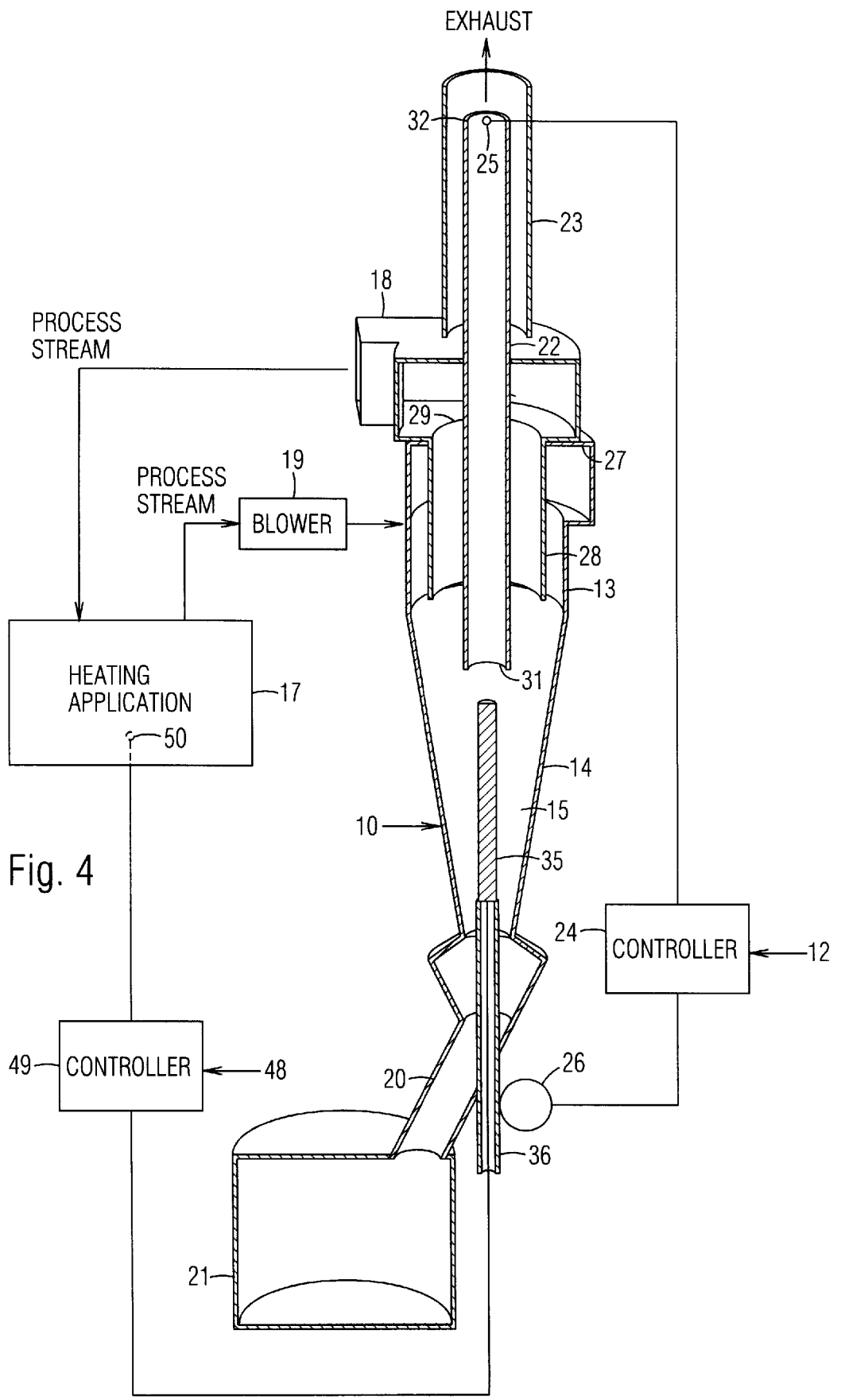

HEATING AND INCINERATION DEVICE

BACKGROUND OF THE INVENTION

1. Field of the Invention

This invention relates generally to coffee roasters and other similar heating devices.

2. Prior Art

Coffee roasting is done by circulating a stream of hot air or process stream of several hundred degrees through coffee beans. The process stream is unavoidably contaminated by particulate matter, such as chaff or husks, and volatile organic compounds from the coffee. In industrial coffee roasting, pollution control guidelines set by the Environmental Protection Agency must be met for limiting the emission of smoke and odor. Specifically, exhaust air from a roaster must be heated to at least 1400 degrees Fahrenheit for at least 0.3 second to assure complete incineration of the volatile organic compounds and particulate matter. In addition to controlling emissions, the chaff must also be extracted from the coffee during roasting.

Various coffee roasters are within the prior art. U.S. Pat. Nos. 5,394,623 to Sewell; 5,372,833 to Farina; 5,230,281 to Wireman et al.; and 3,189,460 to Smith, Jr. each show a roaster with a burner for heating the process stream, and a cyclone separator for extracting chaff from the process stream. The burner is separate from the cyclone separator. U.S. Pat. No. 4,484,064 to Murray shows a coffee roaster with a blower circulating the process stream through a vented coffee container. U.S. Pat. No. 2,212,120 to Kneale et al. shows a roaster in which the process stream is circulated between a roasting chamber and a space with electric heaters. Some of these roasters require an incineration burner in addition to a heating burner that substantially increases energy consumption. Other roasters fully mix the combustion gases from the burner with the process stream. The combustion gases are cooled during the mixing process, and are discharged into the atmosphere at process stream temperature, which is too low to incinerate pollutants. Many of these roasters are once-through systems that draw in air from the outside, pass it through the heating process once, and discharge it. A typical once-through system consumes 100,000 btu/hr for heating the process flow with a heating burner, and an additional 700,000 btu/hr for incinerating pollutants with an incineration burner, so the total energy consumption is very high.

U.S. Pat. Nos. 5,709,542 to Rentzel et al. and 5,427,746 to Pereira et al. show pollution control devices. They each direct the process stream past a flame from a fixed burner into a flame tube where the process stream is thoroughly mixed with the combustion gases before exiting the same outlet. If the temperature inside the flame tube is high enough to incinerate pollutants, then the process stream would be heated to an unnecessarily high temperature, but if the temperature inside the flame tube is at process stream temperature, pollutants will not be incinerated. Therefore, these devices are not suitable for use in heating applications in which the process stream is recirculated.

OBJECTS OF THE INVENTION

Accordingly, objects of the present heating and incineration device are:

- to heat a process stream for a heating application;
- to incinerate pollutants in exhaust gases before discharging them into the atmosphere;
- to extract heavy particles from the process stream;
- to heat the process stream and incinerate pollutants with significantly greater energy efficiency; and
- to be adjustable during operation for maximizing energy efficiency.

Further objects of the present invention will become apparent from a consideration of the drawings and ensuing description.

BRIEF SUMMARY OF THE INVENTION

A heating and incineration device includes a heating chamber for being connected to a heating application. A process stream is recirculated between the heating chamber and the heating application. An incineration tube is positioned into the heating chamber for providing the only exit for gases from the heating chamber and the heating application. A heat source is positioned within the heating chamber in spaced coaxial relation with an incineration tube inlet. The process stream is heated to a working temperature when it is passed through the heating chamber around the periphery of the heat source. The heat source is directed at the incineration tube inlet, so that the highest temperature inside the heating chamber is concentrated along an axis between the heat source and the incineration tube inlet. The distance between the incineration tube inlet and the heat source is adjustable for controlling the temperature inside the incineration tube. Pollutants in the exhaust gases flowing out through the incineration tube are incinerated by the very high temperature along the axis of the tube. Energy efficiency is thus significantly increased by recirculating the process stream to minimize heat loss, and by heating the process stream and incinerating pollutants with a single heat source.

BRIEF DESCRIPTION OF THE SEVERAL VIEWS OF THE DRAWING

FIG. 2 is a cutaway and schematic view of the heating and incineration device of FIG. 1.

FIG. 3A is a graph showing a relationship between incineration temperature and distance.

FIG. 3B is a graph showing a relationship between incineration temperature and flame size.

FIG. 4 is a cutaway and schematic view of a second embodiment of the heating and incineration device.

DRAWING REFERENCE NUMERALS

Figure 1:
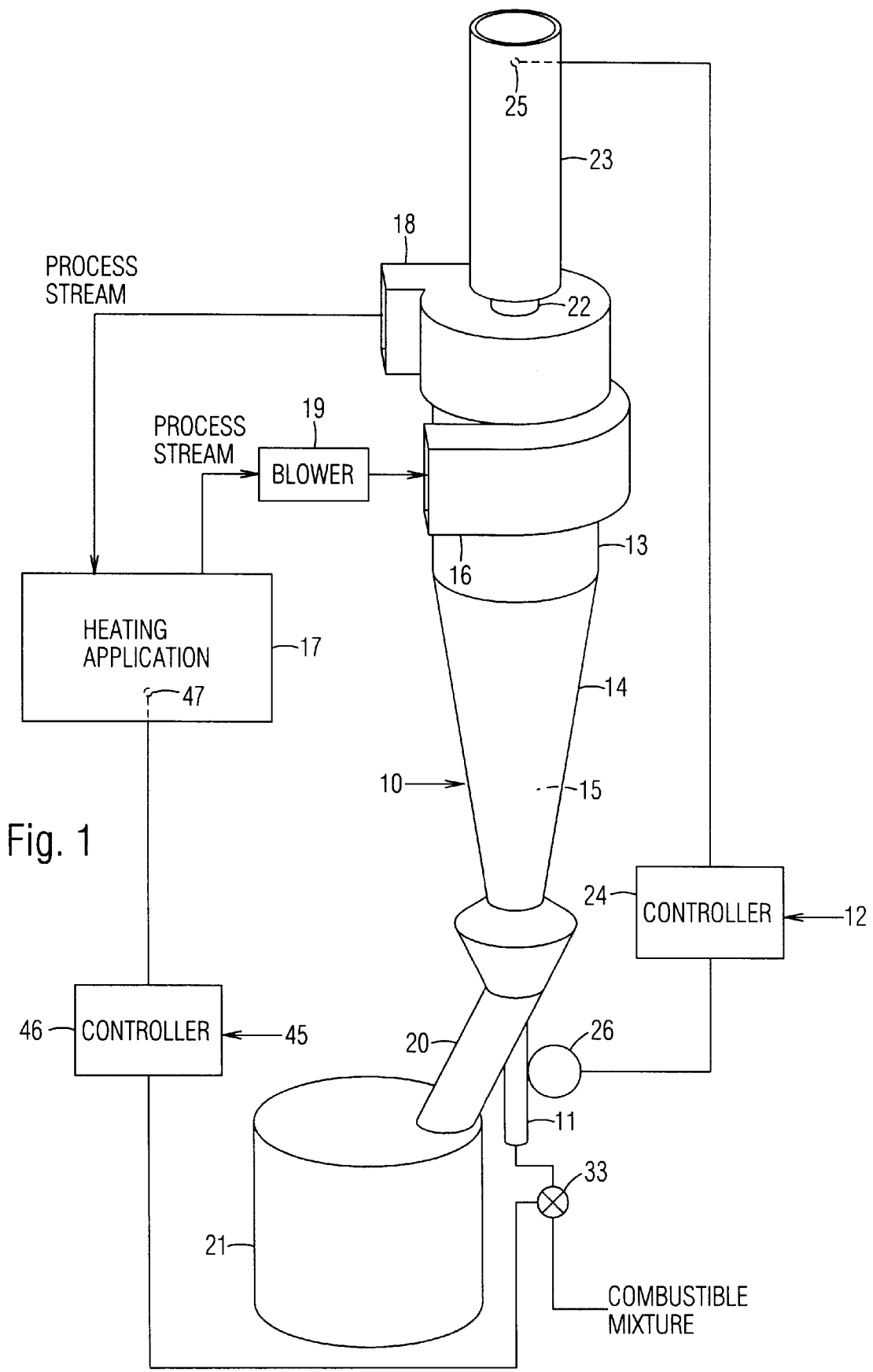
FIG. 1 is a side perspective and schematic view of a first embodiment of the present heating and incineration device.

| | |
|---|---|
| 10. Cyclone Separator | 11. Burner |
| 12. Temperature Regulating System | 13. Tubular Housing |
| 14. Conical Portion | 15. Heating Chamber |
| 16. Process Stream Inlet | 17. Heating Application |
| 18. Process Stream Outlet | 19. Blower |
| 20. Connecting Tube | 21. Hopper |
| 22. Incineration Tube | 23. Stack |
| 24. Controller | 25. Temperature Sensor |
| 26. Actuator | 27. Wall |
| 28. Guide Tube | 29. Aperture |
| 30. Burner Tip | 31. Incineration Tube Inlet |
| 32. Incineration Tube Outlet | 33. Valve |
| 34. Flame | 35. Electric Heating Element |
| 36. Mounting Tube | 37. Housing |
| 38. Heating Chamber | 39. Burner |
| 40. Incineration Tube | 41. Burner Tip |

-continued

DRAWING REFERENCE NUMERALS

| | |
|---|---|
| 42. Incineration Tube Inlet | 43. Heating Application |
| 44. High-Velocity Flame | 45. Temperature Regulating System |
| 46. Controller | 47. Temperature Sensor |
| 48. Inlet | 49. Outlet |

DETAILED DESCRIPTION OF THE INVENTION

FIG. 1

A first embodiment of a heating and incineration device is shown in the side perspective and schematic view in FIG. 1. It is comprised of a cyclone separator 10, a heat source or gas burner 11, an incineration tube temperature regulating system 12, and a heating application temperature regulating system 45. Cyclone separator 10 preferably includes a round tubular housing 13 with a conical portion 14 defining a heating chamber 15 within. A process stream inlet 16 is connected to a top end of housing 13 for receiving a process stream from a heating application 17, such as a coffee roaster, oven, or any other heating process device. A process stream outlet 18 is attached on top of inlet 16 for returning the process stream to heating application 17. A blower 19 is connected between heating application 17 and process stream inlet 16 for recirculating the process stream. Burner 11 is movably positioned through the bottom end of cyclone separator 10. A connecting tube 20 is connected between the bottom end of cyclone separator 10 and a particle collection hopper 21. An incineration tube 22 coaxial with tubular housing 13 is positioned through the top of process stream outlet 18. A stack 23 is positioned around incineration tube 22 for mixing cool air with the exhaust for convenient venting. Incineration tube temperature regulating system 12 is comprised of a programmable controller 24 connected to a temperature sensor 25 positioned within stack 23, and an actuator 26 attached to burner 11. Heating application temperature regulating system 45 is comprised of a programmable controller 46 connected to a temperature sensor 47 positioned in heating application 17, and a valve 33 regulating the flow of a combustible mixture to burner 11.

FIGS. 2–3

The heating and incineration device of FIG. 1 is shown in a cutaway and schematic view in FIG. 2. A wall 27 is attached across the top end of tubular housing 13. A coaxial guide tube 28 is positioned in the top portion of tubular housing 13, and extend downwardly from an aperture 29 in wall 27. Aperture 29 is in communication with process stream outlet 18. Burner 11 includes a burner tip 30 coaxial with tubular housing 13 and positioned near a bottom of heating chamber 15. Incineration tube 22 includes an incineration tube inlet 31 positioned near the top end of heating chamber 15, and an incineration tube outlet 32 positioned outside of cyclone separator 10, but inside stack 23. Temperature sensor 25 is preferably positioned just inside incineration tube outlet 32. Incineration tube 22 is coaxial with burner 11.

In use, the combustible mixture is fed into burner 11 and ignited at burner tip 30 to produce an elongated flame 34 coaxial with cyclone separator 10 and incineration tube 22, and directed at incineration tube inlet 31. Controller 46 is programmed to automatically maintain a selected process stream temperature inside heating application 17. The temperature inside heating application 17 is detected by temperature sensor 47 of heating application temperature regulating system 45. The flow rate of the combustible mixture is regulated by controller 46 through valve 33 for controlling the flame size until the selected process stream temperature inside heating application 17 is reached. The process stream, as indicated by the arrows, is directed into a spin about the axis of tubular housing 13 and around the outside of guide tube 28 by tangential process stream inlet 16 (FIG. 1). The process stream is spiraled downwardly into heating chamber 15 by guide tube 28, and heated to a working temperature of typically several hundred degrees Fahrenheit by its proximity and contact with flame 34 while passing through heating chamber 15. The process stream is also heated by the outside wall of incineration tube 22, which is heated by the flame on the inside.

The spiraling process stream is cooler and heavier than flame 34, so that it is flung to the outer portions of heating chamber 15 by centrifugal force. The combustion products, being the hottest and lightest gases, are confined within the center or vortex of the cyclone. The combustion gases do not mix thoroughly with the process stream. There is only limited heat transfer from the combustion gases to the process stream, so the combustion gases entering incineration tube 22 are maintained at a high temperature. Heavy particulate matter, such as chaff, are flung onto the inner wall of conical section 14 and caused to fall into hopper 21 for collection. The heated process stream is channeled upwardly into guide tube 28, through process stream outlet 18, and recirculated into heating application 17. The clean hot gases are discharged into the atmosphere through incineration tube 22, which is the only exhaust for gases from both the heating and incineration device and the heating application. Incineration tube inlet 31 is coaxial with flame 34 and thus the hottest central column of gases, so that only the hottest gases are drawn through incineration tube 22. Therefore, pollutants in the exhaust gases are incinerated by the high temperature inside incineration tube 22 before being discharged into the atmosphere. Heating of the process flow and incineration of pollutants are thus achieved with a single burner for significantly increased energy efficiency. The process flow is recirculated for minimizing heat loss and further increasing energy efficiency. For example, roasting a typical batch of coffee with a prior art once-through system with a dedicated incineration burner may require about 800,000 btu/hr, but only about 50,000 btu/hr with the present heating and incineration device.

For incinerating pollutants to meet pollution control requirements, the temperature inside incineration tube 22 must be maintained at or above a required minimum temperature, e.g., 1400 degrees Fahrenheit, for a minimum dwell time, e.g., 0.3 second. The desired dwell time is achieved by selecting a suitable volume for incineration tube 22, so that the required minimum time is needed for exhaust gases to travel through it at a maximum anticipated flow rate. For a given flow rate and selected volume, the velocity of gases passing through tube 22 is directly proportional to its length. The dynamic differential pressure within the circulating system, relative to atmospheric pressure, would vary inversely as a function of the diameter of tube 22.

As shown in a simplified, exemplar graph in FIG. 3A, for a given flame size, the temperature inside incineration tube 22 is determined by a distance between burner tip 30 and incineration tube inlet 31: reducing the distance increases the temperature, and increasing the distance lowers the temperature. The distance may be selected to produce a desired temperature for any particular application. Burner 11 is movable along the axis of cyclone separator 10 for adjusting the distance. Controller 24 is programmed to automatically maintain a selected incineration temperature inside incineration tube 22: the exhaust gas temperature is detected by temperature sensor 25, and actuator 26 is activated by controller 24 to move burner 11 and thus vary the distance between burner tip 30 and incineration tube inlet 31 for maintaining the selected temperature. Energy consumption is minimized by setting the temperature to the required minimum incineration temperature.

The distances at which incineration tube 22 and burner 11 extend into cyclone separator 10, and the gap between incineration tube inlet 31 and burner tip 30 determine the temperature in incineration tube 22, thus such distances vary for different heating applications. As shown in a simplified, exemplar graph in FIG. 3B, for a given distance between incineration tube inlet 31 and burner tip 30, the incineration tube temperature is also determined by flame size. Therefore, when flame 34 is adjusted in size by heating application temperature regulating system 45 for controlling the temperature inside heating application 17, the physical position of burner 11 is adjusted in response by incineration tube temperature regulating system 12 for maintaining the temperature inside incineration tube 22.

FIG. 4

A second embodiment of the heating and incineration device is shown in the cutaway and schematic view in FIG. 4. It is the same as the embodiment shown in FIGS. 1 and 2, except the heat source is comprised of an elongated electric heating element 35 coaxial with cyclone separator 10 and incineration tube 22. A heating application temperature regulating system 48 includes a controller 49 connected to heating element 35 and a temperature sensor 50 which is positioned in heating application 17. The current passing through heating element 35 is regulated by controller 49 for controlling the temperature inside heating application 17. Heating element 35 is attached to the end of a mounting rod 36, which is movable by incineration tube temperature regulating system 12 for adjusting the distance between heating element 35 and incineration tube inlet 31 for controlling the temperature inside incineration tube 22.

FIG. 5

Figure 5:
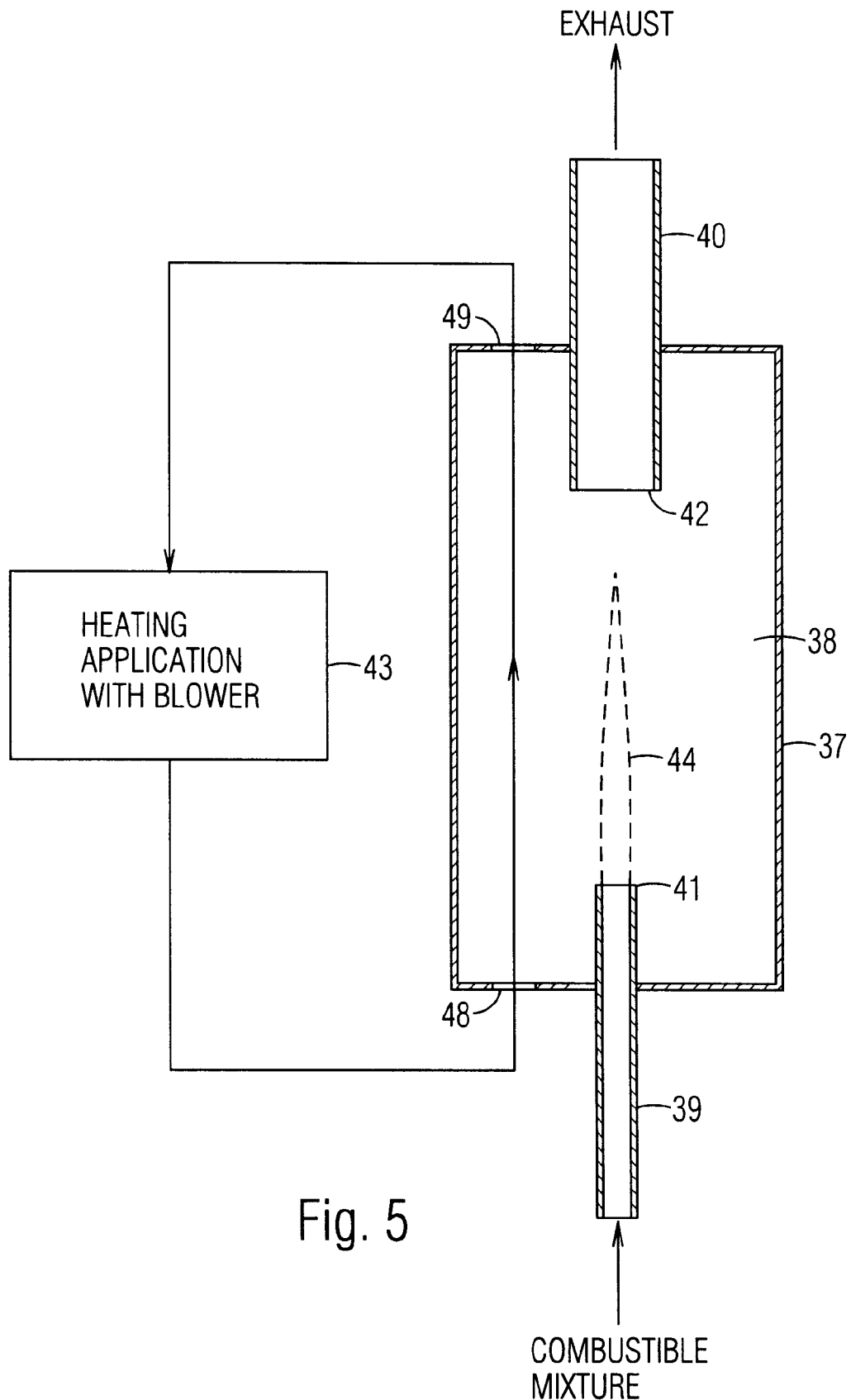
FIG. 5 is a cutaway and schematic view of a third embodiment of the heating and incineration device.

A third embodiment of the heating and incineration device is shown in the cutaway and schematic view in FIG. 5. It is comprised of a housing 37 defining a heating chamber 38 within. A heat source or pressurized gas burner 39 and an incineration tube 40 are coaxial with each other and extend into heating chamber 38. A burner tip 41 and an incineration tube inlet 42 are spaced from each other inside heating chamber 38. A process stream is recirculated between a heating application 43 and a heating chamber 38 through an inlet 48 and an outlet 49 in heating chamber 38. The only exit for gases from heating application 43 and heating chamber 38 is through incineration tube 40. A combustible mixture under sufficient pressure is fed into burner 39 and ignited inside heating chamber 38. A high-velocity flame 44 thus emanating from burner tip 41 is directed at incineration tube inlet 42. The process stream passing through heating chamber 38 is heated by flame 44 to a working temperature. Expanding hot combustion gases create an outflow through incineration tube 40 for discharge into the atmosphere. Even if housing 37 does not produce cyclone action in the process stream, the hottest gases are still directed into incineration tube inlet 42 by the high velocity of flame 44, which is at least about 200 ft/sec. The distance between burner tip 41 and incineration tube inlet 42 is selected for producing a desired incineration temperature inside incineration tube 40, and may be adjustable for precise temperature control during operation.

SUMMARY AND SCOPE

Accordingly, an improved heating and incineration device is provided. It heats a process stream for a heating application. It incinerates pollutants in the exhaust gases before discharging them into the atmosphere. It extracts heavy particles from the process stream. It heats the process stream and also incinerates pollutants with increased energy efficiency. It is also adjustable during operation for maximizing energy efficiency.

Although the above description is specific, it should not be considered as a limitation on the scope of the invention, but only as an example of the preferred embodiment. Many substitutes and variations are possible within the teachings of the invention. For example, in addition to the heat sources described, any other suitable type of heat source may be used. The blower may be connected to the process stream outlet. The heat source may be repositioned manually, and marks may be provided thereon for indicating the distances for a range of incineration tube temperatures. Instead of the heat source being repositionable, the incineration tube may be repositionable, or both may be repositionable. The burner firing rate or flame size may be only manually adjustable, or it may be fixed. The incineration tube and heat source may be fixed relative to each other if incineration tube temperature adjustment is not necessary. Other types of cyclone separators may be used. If the heating chamber is not used for chaff separation so that it does not have to produce a cyclone, it may take any other form. The heating and incineration device may be arranged for heating the process stream to any desired working temperature, and for heating the incineration tube to any desired incineration temperature. The heating and incineration device may be used with any other type of heating application in addition to coffee roasters. Therefore, the scope of the invention should be determined by the appended claims and their legal equivalents, not by the examples given.

I claim:

1. A heating and incineration device, comprising:
    a heating chamber with a chamber inlet for admitting a process stream and a chamber outlet for discharging said process stream;
    an incineration tube extending into said heating chamber, said incineration tube having an incineration tube inlet positioned inside said heating chamber and an incineration tube outlet positioned outside said heating chamber; and
    a heat source positioned inside said heating chamber in coaxial alignment with said incineration tube inlet, said heat source for producing and directing a column of hot gases into said incineration tube inlet and heating an interior of said incineration tube to a high temperature hot enough for incinerating pollutants, said heat source heating said process stream to a lower working temperature when said process stream is passed through said heating chamber, said process stream being directed to flow between said chamber inlet and said chamber outlet, so that said process stream is generally prevented from mixing with said hot gases, said pollutants passing through said incineration tube are incinerated before being exhausted through said incineration tube outlet.

2. The heating and incineration device of claim 1, wherein said heat source is comprised of a gas burner.

3. The heating and incineration device of claim 1, wherein said heat source is comprised of a pressurized gas burner for producing a high velocity flame of at least about 200 ft/sec.

4. The heating and incineration device of claim 1, wherein said heat source is comprised of an electric heating element.

5. The heating and incineration device of claim 1, wherein said heat source is movable axially relative to said incineration tube inlet for adjusting said temperature inside said incineration tube.

6. The heating and incineration device of claim 1, further including an incineration tube temperature regulating system comprising a temperature sensor positioned generally in said incineration tube, a controller connected to said temperature sensor, and an actuator connected to said controller and said heat source, said controller causing said actuator to move said heat source axially relative to said incineration tube inlet for adjusting said temperature inside said incineration tube.

7. A heating and incineration device, comprising:
   a cyclone separator with a process stream inlet for admitting a process stream and a process stream outlet for discharging said process stream, said cyclone separator for spinning said process stream into a cyclone therein for separating particulate matter from said process stream;
   an incineration tube coaxially extending into said cyclone separator, said incineration tube having an incineration tube inlet positioned inside said cyclone separator and an incineration tube outlet positioned outside said cyclone separator; and
   a heat source positioned coaxially inside said cyclone separator in alignment with and spaced from said incineration tube inlet, said heat source for producing and directing a column of hot gases into said incineration tube inlet and heating an interior of said incineration tube to a high temperature hot enough for incinerating pollutants, said heat source heating said process stream to a lower working temperature when said process stream is passed through said cyclone separator, said process stream is cooler and heavier than said hot gases so that said process stream is flung outwardly, said hot gases are hotter and lighter so that said hot gases are confined around an axis of said cyclone separator, said process stream is thus generally prevented from mixing with said hot gases, said pollutants passing through said incineration tube are incinerated before being exhausted through said incineration tube outlet.

8. The heating and incineration device of claim 7, wherein said heat source is comprised of a gas burner.

9. The heating and incineration device of claim 7, wherein said heat source is comprised of a pressurized gas burner for producing a high velocity flame of at least about 200 ft/sec.

10. The heating and incineration device of claim 7, wherein said heat source is comprised of an electric heating element.

11. The heating and incineration device of claim 7, wherein said heat source is movable axially relative to said incineration tube inlet for adjusting said temperature inside said incineration tube.

12. The heating and incineration device of claim 7, further including an incineration tube temperature regulating system comprising a temperature sensor positioned generally in said incineration tube, a controller connected to said temperature sensor, and an actuator connected to said controller and said heat source, said controller causing said actuator to move said heat source axially relative to said incineration tube inlet for adjusting said temperature inside said incineration tube.

13. A heating and incineration device, comprising:
    a heating application for recirculating a process stream;
    a heating chamber connected to said heating application, said heating chamber having a chamber inlet for admitting said process stream from said heating application and a chamber outlet for returning said process stream to said heating application, said process stream being recirculated between said heating application and said heating chamber;
    an incineration tube extending into said heating chamber, said incineration tube having an incineration tube inlet positioned inside said heating chamber and an incineration tube outlet positioned outside said heating chamber; and
    a heat source positioned inside said heating chamber in coaxial alignment with said incineration tube inlet, said heat source for producing and directing a column of hot gases into said incineration tube inlet and heating an interior of said incineration tube to a high temperature hot enough for incinerating pollutants, said heat source heating said process stream to a lower working temperature when said process stream is passed through said heating chamber, said process stream being directed to flow between said chamber inlet and said chamber outlet, so that said process stream is generally prevented from mixing with said hot gases, said pollutants passing through said incineration tube are incinerated before being exhausted through said incineration tube outlet.

14. The heating and incineration device of claim 13, wherein said heat source is comprised of a gas burner.

15. The heating and incineration device of claim 14, further including a heating application temperature regulating system comprising a temperature sensor positioned in said heating application, a valve connected to said gas burner, and a controller connected to said temperature sensor and said valve, said controller adjusting said valve for adjusting said working temperature inside said heating application.

16. The heating and incineration device of claim 13, wherein said heat source is comprised of a pressurized gas burner for producing a high velocity flame of at least about 200 ft/sec.

17. The heating and incineration device of claim 13, wherein said heat source is comprised of an electric heating element.

18. The heating and incineration device of claim 13, wherein said heat source is movable axially relative to said incineration tube inlet for adjusting said temperature inside said incineration tube.

19. The heating and incineration device of claim 13, further including an incineration tube temperature regulating system comprising a temperature sensor positioned generally in said incineration tube, a controller connected to said temperature sensor, and an actuator connected to said controller and said heat source, said controller causing said actuator to move said heat source axially relative to said incineration tube inlet for adjusting said temperature inside said incineration tube.

20. The heating and incineration device of claim 13, further including a heating application temperature regulating system comprising a temperature sensor positioned in said heating application, and a controller connected to said temperature sensor and said heat source, said controller adjusting an intensity of said heat source for adjusting said working temperature inside said heating application.

* * * * *